United States Patent
Ghandour et al.

(10) Patent No.: US 12,215,530 B2
(45) Date of Patent: Feb. 4, 2025

(54) BALK DEVICE FOR DOOR LOCK

(71) Applicant: Rohr, Inc., Chula Vista, CA (US)

(72) Inventors: Imad D. Ghandour, San Diego, CA (US); Ken V. Huynh, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 130 days.

(21) Appl. No.: 18/074,152

(22) Filed: Dec. 2, 2022

(65) Prior Publication Data
US 2023/0399879 A1 Dec. 14, 2023

Related U.S. Application Data

(60) Provisional application No. 63/351,118, filed on Jun. 10, 2022.

(51) Int. Cl.
*E05C 3/12* (2006.01)
*B64D 29/06* (2006.01)

(52) U.S. Cl.
CPC .............. *E05C 3/12* (2013.01); *B64D 29/06* (2013.01); *E05C 2003/126* (2013.01)

(58) Field of Classification Search
CPC ............ F02K 1/766; E05C 3/12; B64D 29/06
See application file for complete search history.

(56) References Cited

U.S. PATENT DOCUMENTS

| | | | |
|---|---|---|---|
| 4,365,775 A | 12/1982 | Glancy | |
| 4,437,783 A * | 3/1984 | Halin | F02K 1/15 292/201 |
| 5,826,823 A | 10/1998 | Lymons | |
| 11,053,887 B2 | 7/2021 | Gormley | |
| 2015/0308292 A1* | 10/2015 | Forcier | B64D 29/06 415/213.1 |
| 2017/0022934 A1* | 1/2017 | Caruel | F02K 1/60 |
| 2020/0263633 A1 | 8/2020 | Caruel | |

FOREIGN PATENT DOCUMENTS

| | | |
|---|---|---|
| EP | 0763654 B1 | 12/1999 |
| FR | 2749343 B1 | 2/1999 |
| FR | 3018862 A1 | 9/2015 |

OTHER PUBLICATIONS

EP Search Report for EP Patent Application No. 23178283.0 dated Oct. 26, 2023.

* cited by examiner

*Primary Examiner* — Andrew H Nguyen
(74) *Attorney, Agent, or Firm* — Getz Balich LLC (57) ABSTRACT

An assembly is provided for an aircraft. This aircraft assembly includes a latch, a balk element and a fitting. The latch is movable between an unlocked position and a locked position. The balk element is rotatable between a balked position and an un-balked position. The balk element is configured to block the latch from moving to the locked position when the balk element is in the balked position. The fitting includes a keeper. The fitting is movable between an open position and a closed position. The fitting is configured to push the balk element into the un-balked position as the fitting moves into the closed position. The latch is configured to move to the locked position and engage the keeper when the fitting is in the closed position.

19 Claims, 11 Drawing Sheets

BALK DEVICE FOR DOOR LOCK

CROSS-REFERENCE TO RELATED APPLICATIONS

This application claims priority to U.S. Provisional Patent Application. No. 63/351,118 filed Jun. 10, 2022, which is hereby incorporated herein by reference in its entirety.

BACKGROUND

1. Technical Field

This disclosure relates generally to an aircraft and, more particularly, to a door lock for the aircraft.

2. Background Information

An aircraft includes various doors such as, but not limited to, fuselage doors, thrust reverser doors, cowl doors, hatches, etc. These aircraft doors may be operable to pivot between an open position and a closed position. When in the closed position, each door may be locked/secured to a fixed structure of the aircraft using a door lock. Various types of configurations of door locks are known in the art. While these known door locks have various advantages, there is still room in the art for improvement. There is a need in the art, for example, for a failsafe mechanism which may prevent the door lock for locking when the aircraft door has not yet been fully closed.

SUMMARY OF THE DISCLOSURE

According to an aspect of the present disclosure, an assembly is provided for an aircraft. This aircraft assembly includes a latch, a balk element and a fitting. The latch is movable between an unlocked position and a locked position. The balk element is rotatable between a balked position and an un-balked position. The balk element is configured to block the latch from moving to the locked position when the balk element is in the balked position. The fitting includes a keeper. The fitting is movable between an open position and a closed position. The fitting is configured to push the balk element into the un-balked position as the fitting moves into the closed position. The latch is configured to move to the locked position and engage the keeper when the fitting is in the closed position.

According to another aspect of the present disclosure, another assembly is provided for an aircraft. This aircraft assembly includes a door, a latch and a balk element. The door is moveable between an open position and a closed position. The latch is rotatable between an unlocked position and a locked position. The balk element is rotatable between a balked position and an un-balked position. The balk element is configured to block the latch from moving to the locked position when the balk element is in the balked position. The balk element is configured to permit movement of the latch to the locked position when the balk element is in the un-balked position. Rotation of the balk element is passively actuated as the door moves into the closed position.

According to still another aspect of the present disclosure, another assembly is provided for an aircraft. This aircraft assembly includes a stationary structure, a door, a keeper, a latch and a balk element. The door is movable between an open position and a closed position. The keeper is mounted with the door. The latch is mounted with the stationary structure. The latch is movable between an unlocked position and a locked position in which the latch engages the keeper and secures the door to the stationary structure. The balk element is decoupled from the latch and rotatable between a balked position and an un-balked position. The balk element is configured to block movement of the latch to the locked position when door is not in the closed position. The balk element is configured to permit movement of the latch to the locked position when the door is in the closed position.

The aircraft assembly may also include a fitting. The fitting may include the keeper. The fitting may be configured to push the balk element into the un-balked position as the door moves into the closed position.

The balk element may be configured discrete from and may not be coupled to the latch.

The aircraft assembly may also include a fitting. The fitting may include a keeper. The fitting may be configured to push the balk element into the un-balked position as the door moves into the closed position. The latch may be configured to engage the keeper when the door is in the closed position.

The latch may be rotatable about a latch axis between the unlocked position and the locked position. The balk element may be rotatable about a balk element axis between the balked position and the un-balked position. The balk element axis may be angularly offset from the latch axis.

The balk element axis may be perpendicular to the latch axis.

The aircraft assembly may also include a first mount and a second mount. The balk element may be disposed between and rotatably connected to the first mount and the second mount.

The balk element may include a lever arm. The lever arm may be configured to block movement of the latch to the locked position when the balk element is in the balked position. The fitting may be configured to engage the lever arm when the fitting is in the closed position.

The lever arm may include an arm base and an arm lip at a distal end of and projecting out from the arm base.

The aircraft assembly may also include a spring element configured to bias the balk element from the un-balked position to the balked position.

The spring element may be configured as or otherwise include a torsional spring.

The aircraft assembly may also include a second spring element further configured to bias the balk element from the un-balked position to the balked position.

The aircraft assembly may also include a stop element configured to stop rotation of the balk element at the balked position when the balk element is rotating in a direction from the un-balked position to the balked position.

The aircraft assembly may also include a stop element configured to stop more than a predetermined amount of rotation of the balk element past the un-balked position when the balk element is rotating in a direction from the balked position to the un-balked position.

The fitting may also include a first wall and a second wall. The keeper may be located between and connected to the first wall and the second wall. The first wall may be configured to push the balk element into the un-balked position as the fitting moves into the closed position.

The aircraft assembly may also include a stationary structure and a door. The latch and the balk element may be mounted with the stationary structure. The fitting may be mounted with the door. The door may be secured to the stationary structure when the latch is in the locked position and is engaged with the keeper.

The door may be configured as a thrust reverser door.

The aircraft assembly may also include a lock, a second balk element and a second fitting. The lock may include the latch and a second latch. The second latch may be moveable between a second latch unlocked position and a second latch locked position. Movement of the second latch may be timed with movement of the latch. The second balk element may be rotatable between a second balk balked position and a second balk un-balked position. The second balk element may be configured to block the second latch from moving to the second latch locked position when the second balk element is in the second balk balked position. The second fitting may include a second keeper. The second fitting may be movable between a second fitting open position and a second fitting closed position. The second fitting may be configured to push the second balk element into the second balk un-balked position as the second fitting moves into the second fitting closed position. The second latch may be configured to move to the second latch locked position and engage the second keeper when the second fitting is in the second fitting closed position.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
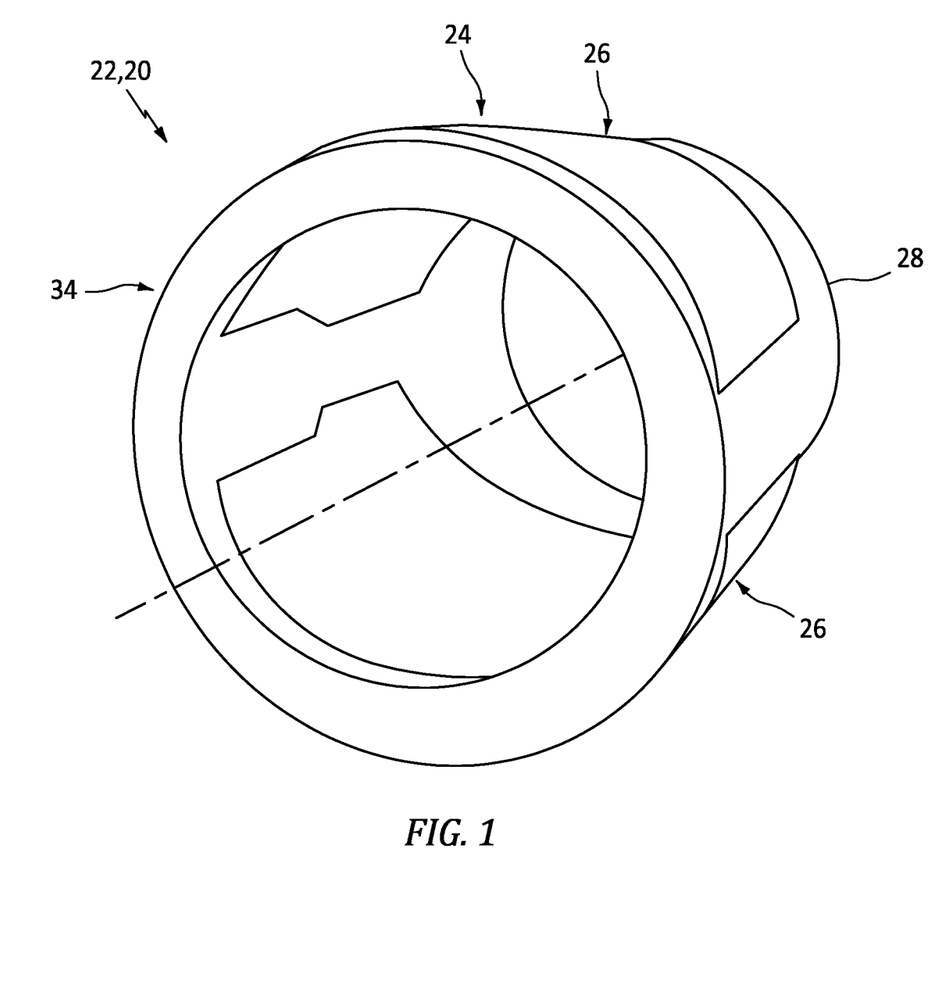
FIG. 1 is a perspective illustration of an aft section of an aircraft propulsion system with its thrust reverser stowed.
Figure 2:
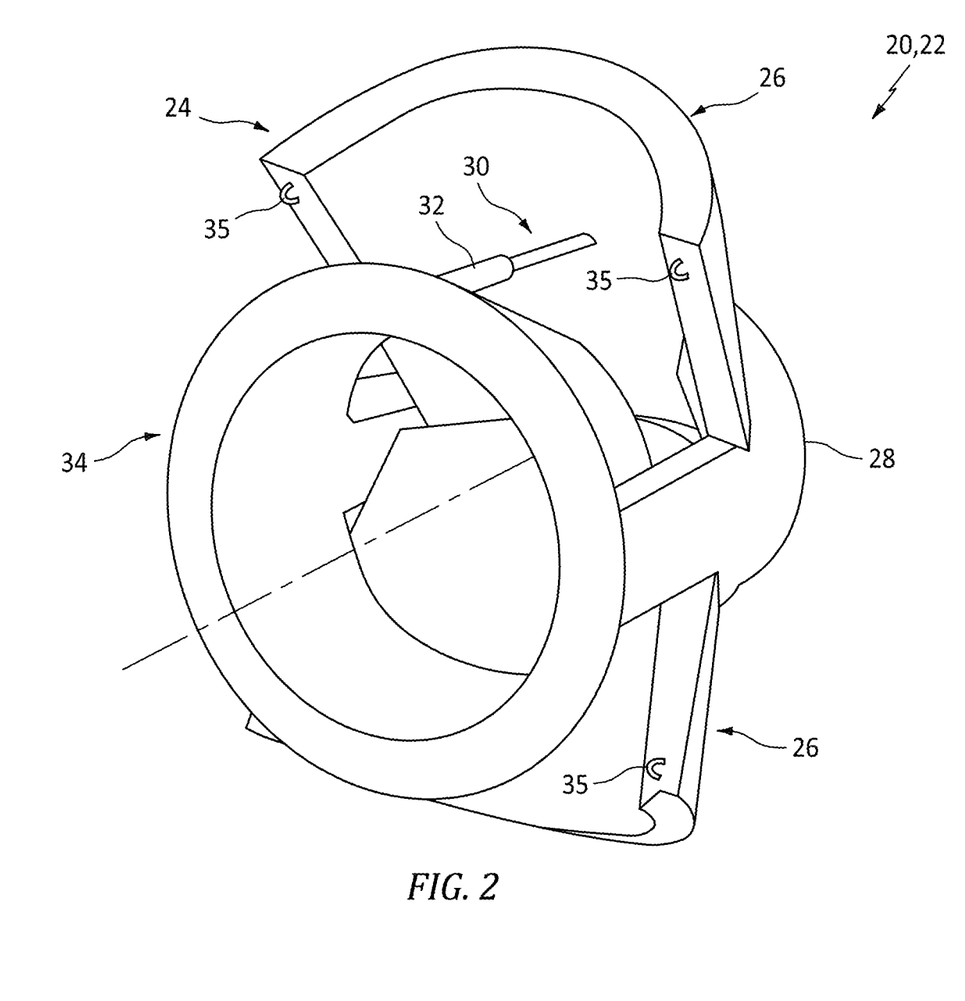
FIG. 2 is a perspective illustration of the aft section of the aircraft propulsion system with its thrust reverser deployed.

FIGS. 1 and 2 illustrate an aft section 20 of a propulsion system 22 for an aircraft such as, but not limited to, a commercial airliner or cargo plane. This aircraft propulsion system 22 includes a thrust reverser 24 to provide reverse thrust during aircraft landing. The thrust reverser 24 may be configured as a pivoting door type thrust reverser such as, for example, a target-type thrust reverser or a clamshell-type thrust reverser. The thrust reverser 24 of FIGS. 1 and 2, for example, includes one or more thrust reverser doors 26.

Each of the thrust reverser doors 26 is moveable (e.g., pivotable) between a closed/stowed position (see FIG. 1) and an open/deployed position (see FIG. 2). At the open position, the thrust reverser doors 26 of FIG. 2 deflect/redirect an internal gas flow—output from a gas turbine engine (not visible) of the aircraft propulsion system 22—upstream of an exhaust nozzle 28 of the aircraft propulsion system 22. With such an arrangement, the thrust reverser 24 may be called a pre-exit thrust reverser. The thrust reverser 24, however, may alternatively deflect/redirect the internal gas flow downstream of the exhaust nozzle 28. With such an arrangement, the thrust reverser 24 may be called a post-exit thrust reverser. The internal gas flow may be a hot gas stream (e.g., a core gas stream) output from the gas turbine engine, or may include both an outer cold gas stream (e.g., a bypass gas stream) and an inner hot gas stream (e.g., a core gas stream) output from the gas turbine engine. Other examples of suitable thrust reversers are disclosed in U.S. Pat. No. 11,053,887, which is assigned to the assignee of the present disclosure and hereby incorporated herein by reference in its entirety. The present disclosure, however, is not limited to such exemplary thrust reverser configurations.

Referring to FIG. 2, the thrust reverser 24 includes an actuation system 30 configured to move the thrust reverser doors 26 between the closed position and the open position. This actuation system 30 may include a single actuator 32 for each thrust reverser door 26. With such an arrangement, the actuator 32 may be arranged at an (e.g., circumferentially) intermediate location along the respective thrust reverser door 26. A first end of the actuator 32 may be coupled to a stationary structure 34 of the aircraft propulsion system 22 such as a stationary structure of a nacelle housing the gas turbine engine. A second end of the actuator 32 may be coupled to the respective thrust reverser door 26 at the intermediate location. Of course, in other embodiments, the actuation system 30 may include multiple actuators 32 for each thrust reverser door 26 where, for example, the actuators 32 are arranged at (e.g., on, adjacent or proximate) opposing sides of the respective thrust reverser door 26. Each actuator 32 of the actuation system 30 may be configured as a linear actuator such as, but not limited to, a hydraulic cylinder. The present disclosure, however, is not limited to such exemplary actuation system nor actuator configurations. For example, each thrust reverser door 26 may be associated with its own respective actuator(s) 32. In another example, the thrust reverser doors 26 may share a common actuator 32 or common actuators 32 where, for example, the common actuator(s) 32 are coupled to each thrust reverser door 26 via a linkage system.

Figure 3:
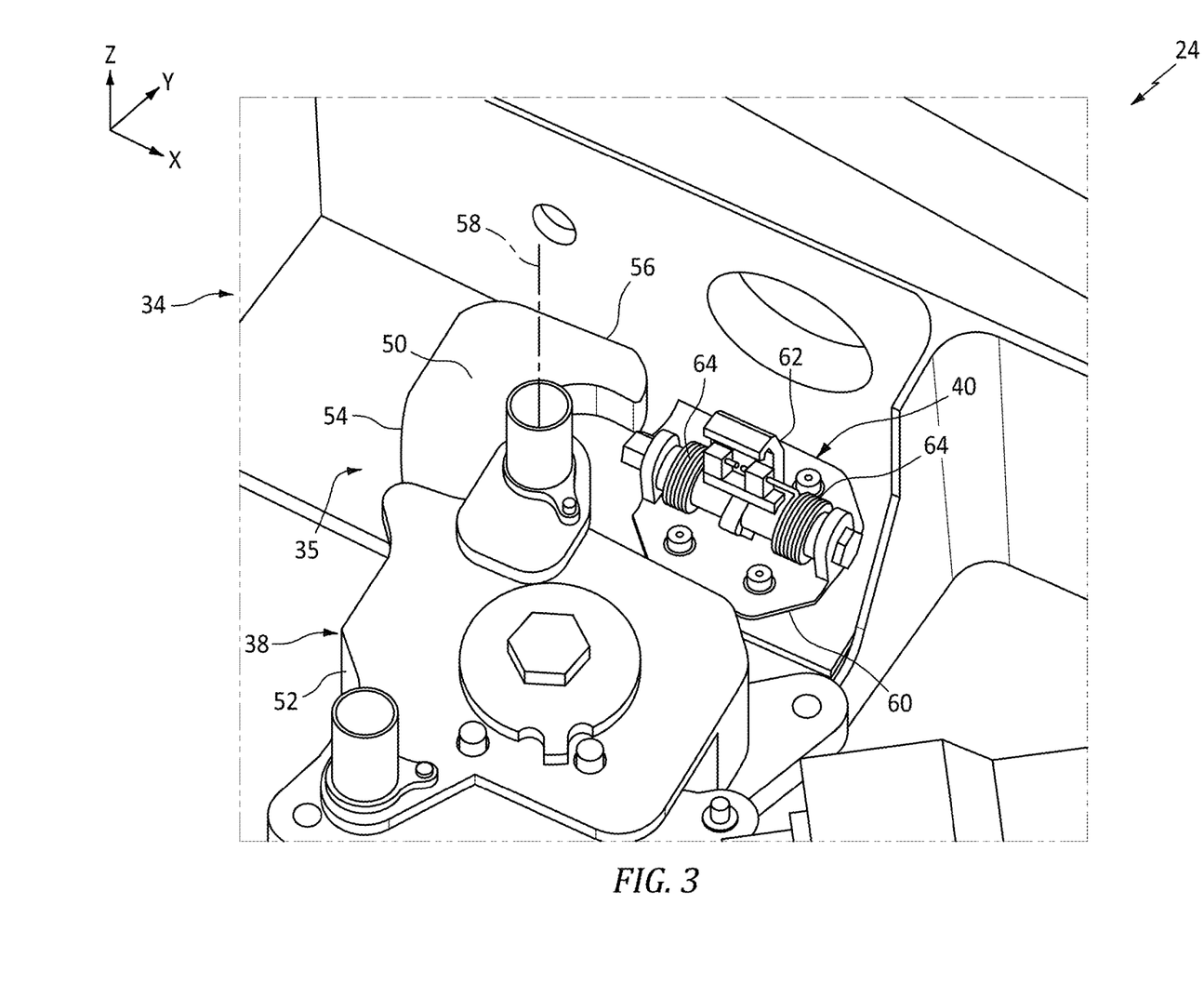
FIG. 3 is a partial perspective illustration of the thrust reverser with its door lock in an unlocked position and its balk device in a balked position.
Figure 4:
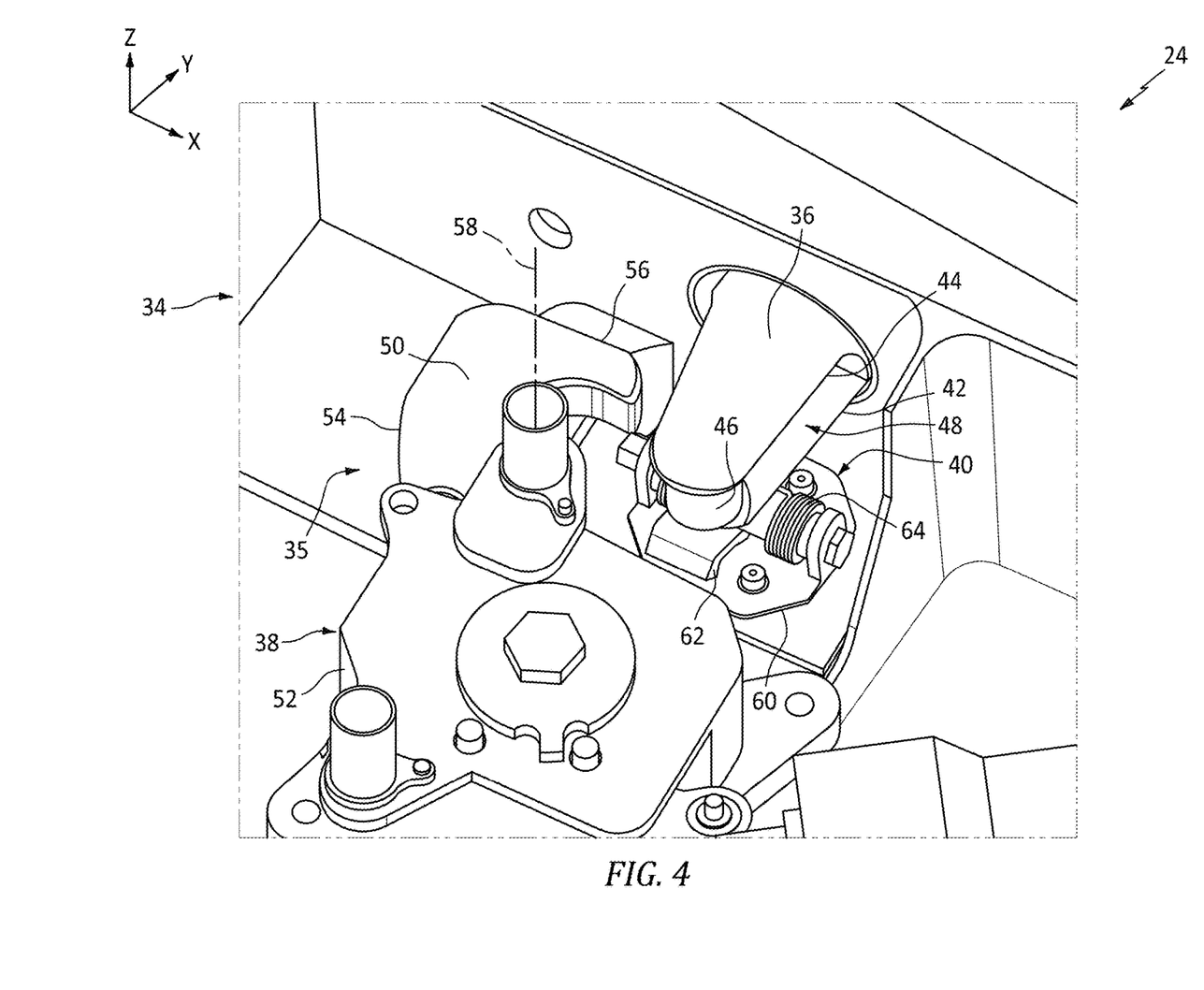
FIG. 4 is a partial perspective illustration of the thrust reverser with its door lock in an unlocked position and its balk device in an un-balked position.
Figure 5:
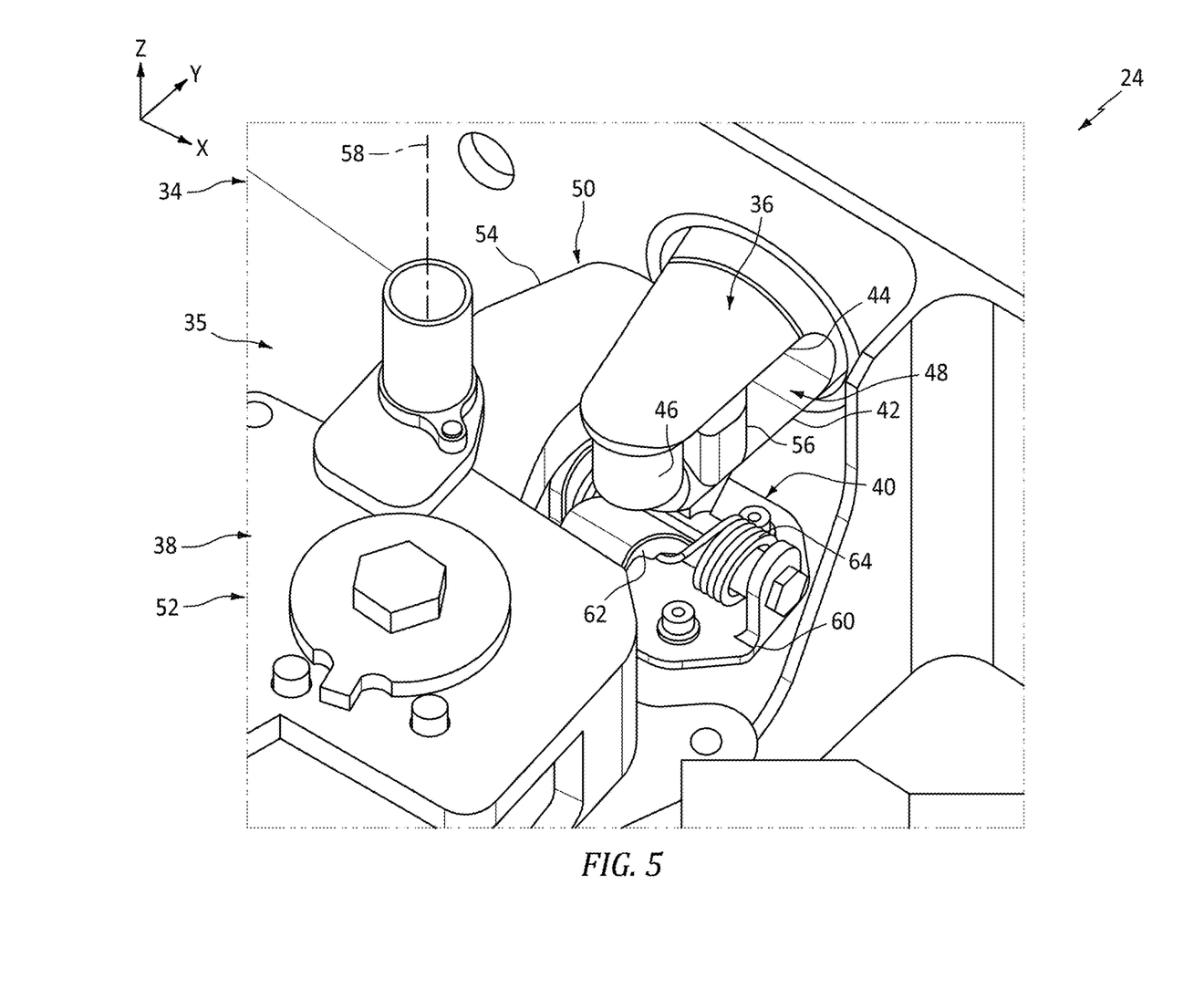
FIG. 5 is a partial perspective illustration of the thrust reverser with its door lock in a locked position.

When the thrust reverser doors 26 are in their closed positions of FIG. 1, the thrust reverser doors 26 may be secured to the stationary structure 34 to prevent movement of the thrust reverser doors 26, unwanted deployment of the thrust reverser doors 26, disruption of flow along the aircraft propulsion system 22, etc. To secure each thrust reverser door 26 in its closed position, each thrust reverser door 26 may be configured with one or more door lock assemblies 35. FIGS. 3-5 illustrate an exemplary one of these lock assemblies 35 for securing the thrust reverser door 26 to the stationary structure 34 in its closed position. The lock assembly 35 of FIGS. 3-5 includes a door lock fitting 36, a door lock-lock 38 and a door lock balk device 40.

The fitting 36 of FIGS. 4 and 5 is mounted with a respective one of the thrust reverser doors 26 (see FIG. 2). The fitting 36 of FIGS. 4 and 5 includes a first wall 42, a second wall 44 and a keeper 46. The first wall 42 and the second wall 44 project laterally (e.g., along a y-axis) out from the respective thrust reverser door 26 to a (e.g., unsupported) distal end of the fitting 36. The first wall 42 and the second wall 44 may be parallel with one another. The first wall 42 is vertically spaced (e.g., along a z-axis) from the second wall 44 to provide the fitting 36 with a channel 48; e.g., a latch receptacle. The fitting channel 48 extends longitudinally (e.g., along an x-axis) through the fitting 36. The fitting channel 48 extends vertically between and to the first wall 42 and the second wall 44. The keeper 46 is located vertically between the first wall 42 and the second wall 44. This keeper 46 extends vertically across the fitting channel 48 between and to the first wall 42 and the second wall 44. The keeper 46 is also connected to (e.g., formed integral with or otherwise attached to) the first wall 42 and the second wall 44. The keeper 46 of FIGS. 4 and 5 has a cylindrical geometry; however, the present disclosure is not limited to such an exemplary geometry.

The fitting 36 and its elements 42, 44 and 46 are movable (e.g., translatable along an arc) between an open/deployed position (see FIG. 2) and a closed/stowed position (see FIGS. 4 and 5). More particularly, the fitting 36 and its elements 42, 44 and 46 are fixed to/movable with the respective thrust reverser door 26, and the respective thrust reverser door 26 is movable (e.g., pivotable) between the open position of FIG. 2 and the closed position of FIG. 1. When the respective thrust reverser door 26 is in its open position of FIG. 2, the fitting 36 and its elements 42, 44 and 46 are in their open position. When the respective thrust reverser door 26 is in its closed position of FIG. 1, the fitting 36 and its elements 42, 44 and 46 are in their closed position of FIGS. 4 and 5.

The lock 38 of FIGS. 3-5 includes a door lock latch 50 (e.g., a lock hook) and a door lock actuator 52. This assembly lock 38 and its elements 50 and 52 are mounted with the stationary structure 34.

The latch 50 of FIG. 3 includes a latch base 54 and a latch projection 56 cantilevered from the latch base 54. The latch projection 56 is disposed at (e.g., on, adjacent or proximate) a lateral end of the latch 50, and is connected to (e.g., formed integral with or otherwise attached to) the latch base 54. The latch projection 56 projects longitudinally out from the latch base 54 to a (e.g., unsupported) distal end of the latch projection 56. The latch base 54 and the latch projection 56 may provide the latch 50 with a hooked configuration; e.g., a L-shape, a J-shape, etc.

The latch 50 is moveable between an unlocked position (see FIGS. 3 and 4) and a locked position (see FIG. 5). The latch 50, for example, is rotatable (e.g., pivotable) about a latch axis 58, which latch axis 58 may extend vertically along the z-axis. The lock actuator 52 is operatively coupled to the latch 50. This lock actuator 52 may rotate the latch 50 about the latch axis 58 between the unlocked position of FIGS. 3 and 4 and the locked position of FIG. 5.

The balk device 40 of FIGS. 3-5 is mounted to the stationary structure 34 discrete (e.g., separate, independent, etc.) from the lock 38. The balk device 40 is also physically disconnected from (not operatively coupled to) the lock 38 and its elements 50 and 52. With such an independent arrangement, operation of the lock 38 and its elements 50 and 52 in and of itself do not actuate operation of the balk device 40. Rather, balk device operation may be passively actuated by operation (e.g., movement) of the fitting 36 and, the, a respective thrust reverser door 26 as described below in further detail.

Figure 6:
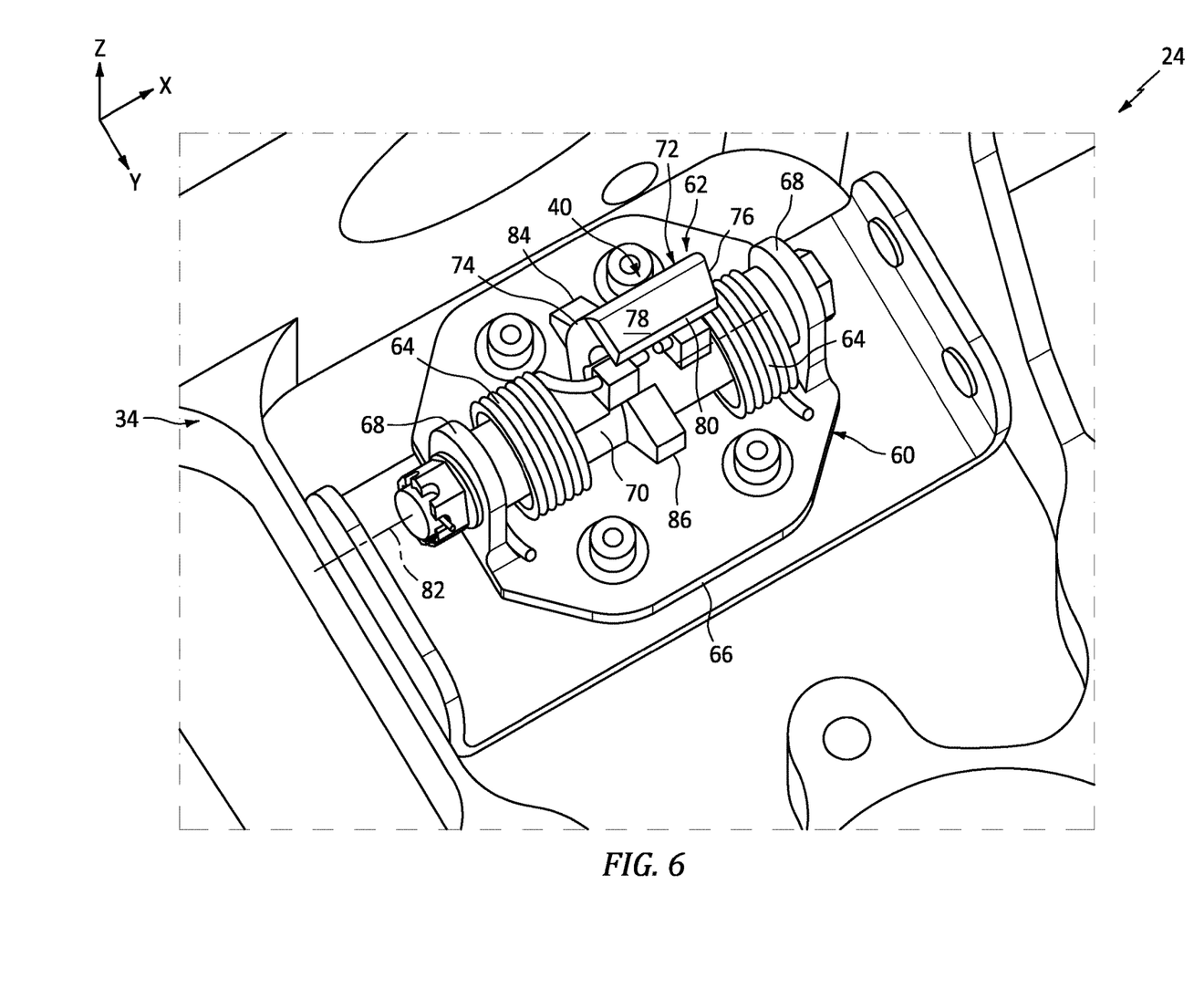
FIG. 6 is a partial perspective illustration of the thrust reverser with its balk device in the un-balked position.

Referring to FIG. 6, the balk device 40 includes a balk device bracket 60, a balk device balk element 62 and one or more balk device spring elements 64. The balk device bracket 60 of FIG. 6 includes a platform 66 and one or more mounts 68. The bracket platform 66 is mounted to and may lay against/along the stationary structure 34. The bracket mounts 68 are connected to (e.g., formed integral with or otherwise attached to) the bracket platform 66. Each of the bracket mounts 68 projects vertically out from the bracket platform 66 to a respective (e.g., unsupported) distal end of the respective bracket mount 68. Each of the bracket mounts 68 may be configured as a mounting tab, a mounting flange or another type of protrusion projecting out from the bracket platform 66. The bracket mounts 68 are longitudinally spaced apart from one another.

The balk element 62 includes an element mount 70 and a lever arm 72. The element mount 70 is disposed longitudinally between the bracket mounts 68. This element mount 70 is rotatably (e.g., pivotally) attached to the bracket mounts 68. The lever arm 72 is connected to (e.g., formed integral with or otherwise attached to) the element mount 70. The lever arm 72 of FIG. 6 includes an arm base 74 and an arm lip 76. When the balk element 62 is in its balked position of FIG. 6, the arm base 74 projects vertically out from the element mount 70 to a (e.g., unsupported) distal end 78 of the lever arm 72 and its arm base 74. The arm lip 76 is disposed at (e.g., on, adjacent or proximate) the distal end 78. This arm lip 76 projects longitudinally out from the arm base 74 to a (e.g., unsupported) distal end 80 of the arm lip 76. The arm base 74 and the arm lip 76 may provide the lever arm 72 with a L-shaped geometry; see also FIGS. 7 and 8.

Figure 7:
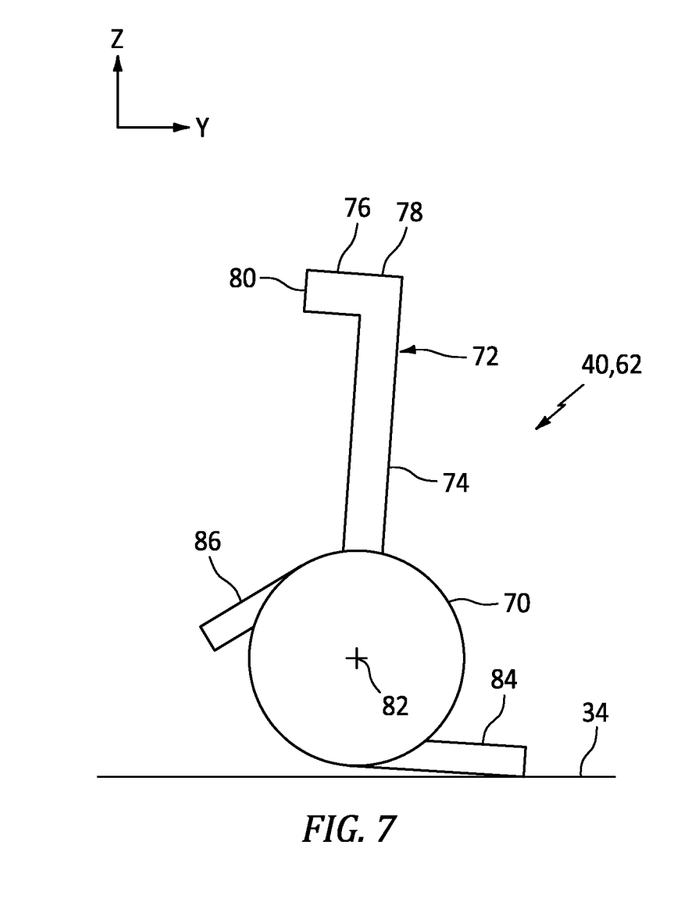
FIG. 7 is a side schematic illustration of a balk device in the balked position.
Figure 8:
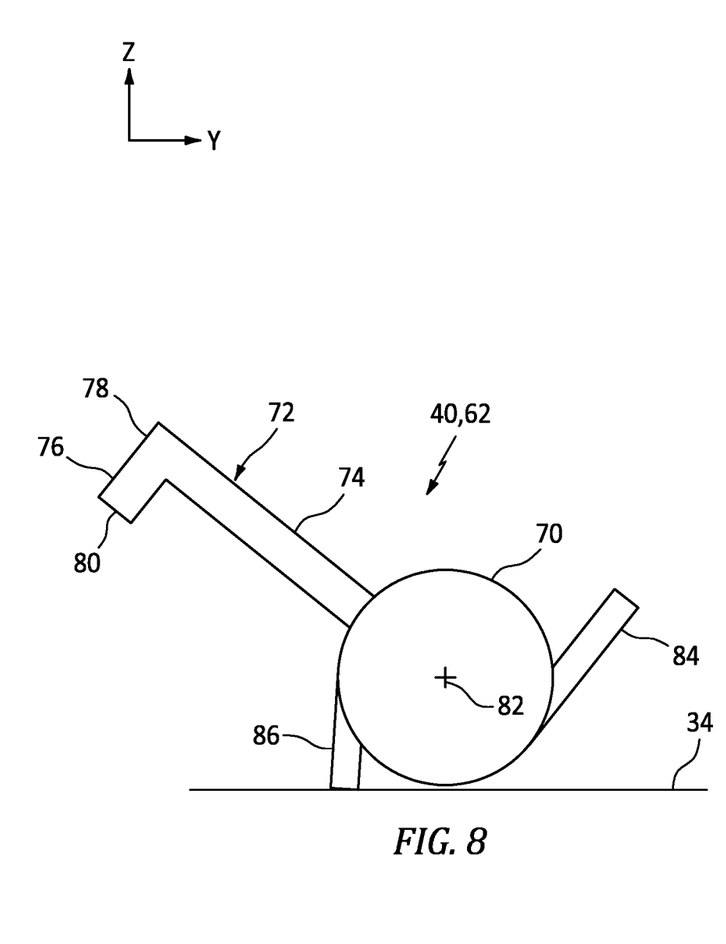
FIG. 8 is a side schematic illustration of the balk device in the un-balked position.

Referring to FIGS. 7 and 8, the balk element 62 is movable between the balked position (see FIG. 7; see also FIGS. 3 and 6) and an un-balked position (see FIG. 8; see also FIGS. 4 and 5). The balk element 62, for example, is rotatable (e.g., pivotable 20, 30, 40, 50, 60, 70, 80 degrees) about a balk axis 82. This balk axis 82 may extend laterally along the x-axis (see FIG. 6). The balk axis 82 of FIG. 6 is angularly offset from (e.g., perpendicular to) the latch axis 58 of FIGS. 3-5.

Referring to FIG. 6, the spring elements 64 are arranged with the balk element 62 (e.g., mounted on the element mount 70) to bias the balk element 62 and its lever arm 72 from the un-balked position of FIG. 8 to the balked position of FIG. 7. The spring elements 64 of FIG. 6 are disposed on opposing lateral sides of the balk element 62 and its lever arm 72. The spring elements 64 may dampen rotation of the balk element 62 to reduce (e.g., minimize) loading during operation. The spring elements 64 may also or alternatively preload the balk element 62 against vibratory loading. Each of the spring elements 64 may be configured as a torsional spring or any other suitable spring.

The balk element 62 of FIG. 6 may also include one or more stop elements 84 and 86. Referring to FIG. 7, the balked position stop element 84 is configured to stop rotation of the balk element 62 at the balked position when the balk element 62 is rotating in a direction from the un-balked position of FIG. 8 to the balked position of FIG. 7. With such an arrangement, the spring elements 64 may push the balk element 62 into the balked position of FIG. 7 and the balked position stop element 84 may prevent over rotation of the balk element 62 past the balked position of FIG. 7. Similarly, referring to FIG. 8, the un-balked position stop element 86 is configured to stop over-rotation of the balk element 62 a certain amount (e.g., 5 or 10 degrees) past the un-balked position when the balk element 62 is rotating in a direction from the balked position of FIG. 7 to the un-balked position of FIG. 8. With such an arrangement, when the balk element 62 is actuated by the fitting 36 as described below, the un-balked position stop element 86 may prevent over rotation of the balk element 62 past the un-balked position of FIG. 8. One or both of the stop elements 84 and 86 of FIG. 6 may each be configured as a protrusion that projects out from the element mount 70 and is configured to selectively engage the balk device bracket 60 and its bracket platform 66.

Figure 9:
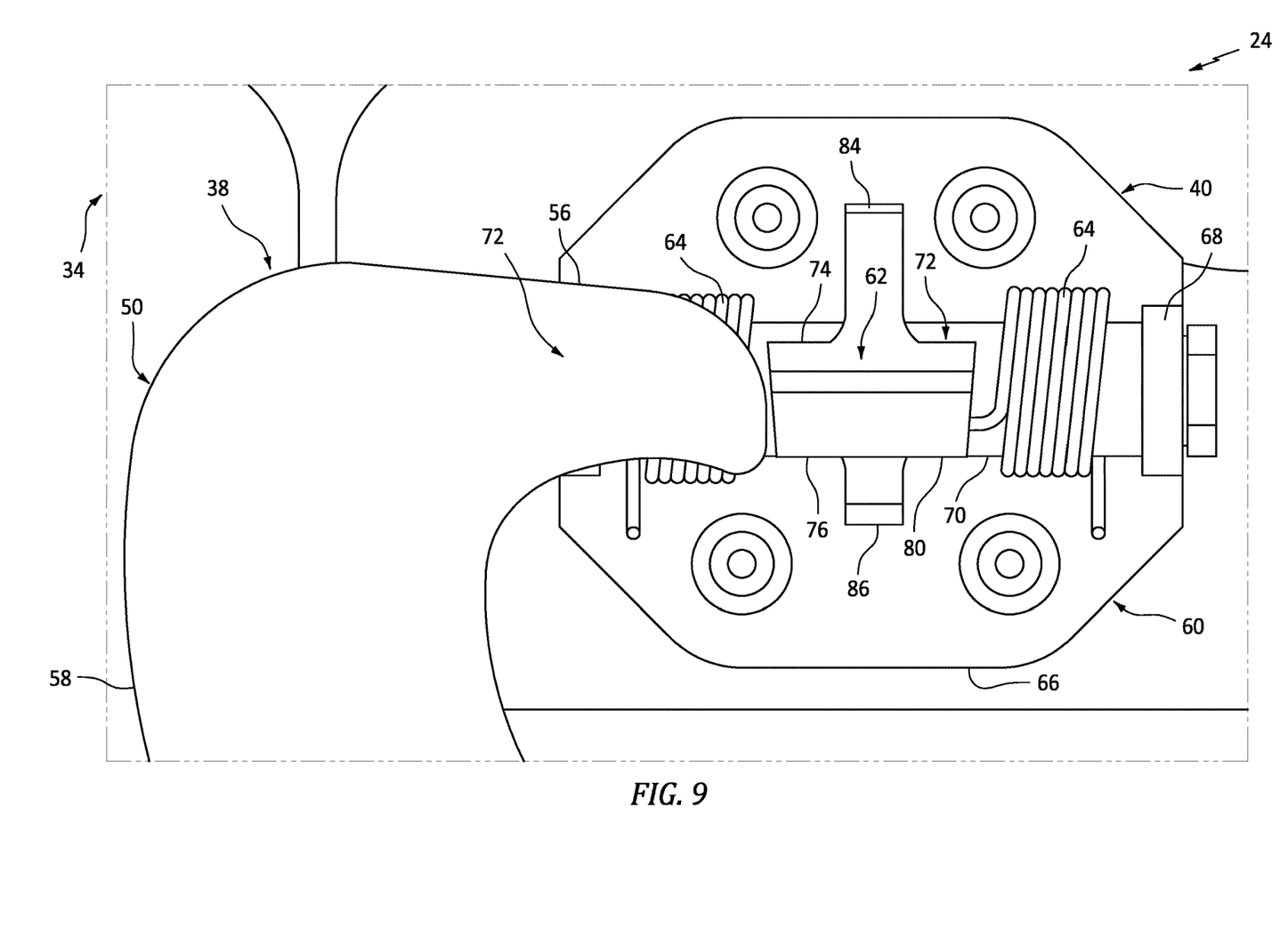
FIG. 9 is a partial illustration of the thrust reverser with its balk device balking movement of the lock.

Referring to FIG. 9, when the balk element 62 is in its balked position (e.g., an upright position), the balk element 62 is configured to block the latch 50 from moving to its locked position of FIG. 5. The balk element 62 and its elements 74 and 76, for example, are laterally aligned with the latch 50 and its latch projection 56 at the projection distal end 80. The balk element 62 may thereby prevent the latch 50 from moving to its locked position of FIG. 5 before the fitting 36 is (e.g., properly) positioned to engage with the latch 50. However, when the fitting 36 is moved from its fitting open position of FIG. 2 towards its fitting closed position FIG. 4, the fitting 36 pushes the balk element 62 from the balked position of FIG. 3 to the un-balked position of FIG. 4. More particularly, the first wall 42 and/or the keeper 46 engage (e.g., contact) and push the balk element 62 to its un-balked position. When the fitting 36 is in its fitting closed position and, thus, the balk element 62 is in its un-balked position, the latch 50 may move from the unlocked position of FIG. 4 to the locked position of FIG. 5 and engage (e.g., contact, hook about, etc.) the keeper 46. When the latch 50 engages the keeper 46, the latch 50 and the keeper 46 are locked/mated together and secure the respective thrust reverser door 26 to the stationary structure 34. With the latch 50 and the keeper 46 mated, the latch 50 and the keeper 46 may provide a load path between the stationary structure 34 and the respective thrust reverser door 26.

To move the latch 50 from the unlock position of FIG. 4 to the locked position of FIG. 5, the lock actuator 52 may be de-energized. Alternatively, the lock actuator 52 may be energized to move the latch 50 from its unlocked position to its locked position. Once the latch 50 is at the locked position of FIG. 5, a signal may be provided indicating the respective thrust reverser door 26 is properly closed and the latch is locked. In addition or alternatively, when the latch 50 is at the unlocked position of FIGS. 3 and 4 and the respective thrust reverser door 26 is not fully in its closed position, a signal may be provided indicating the respective thrust reverser door 26 is open/not closed and the latch 50 is unlocked. The signal(s) may be provided by a sensor arranged with the lock assembly 35 and/or a sensor arranged with the respective thrust reverser door 26. The signal(s) may also or alternatively be provided by the lock actuator 52.

The balk device 40 is configured such that the balk element 62 balks the latch 50 from moving to its locked position (e.g., re-engaging) until the fitting 36 is in a (e.g., over-stowed) position and has pushed the balk element 62 out of the way. When the balk element 62 is balking the latch 50 from moving to its locked position, a lock status proximity switch or sensor may indicate the latch 50 is unlocked.

Referring to FIG. 9, the balk element 62 may be shaped to increase (e.g., maximize) overlap with the latch 50 to provide improved (e.g., optimized) balking. The balk element 62 may also be shaped to improve contact with the latch 50 to increase (e.g., optimize) sliding surface friction during opening and closing movement of the respective thrust reverser door 26.

To minimize a duty cycle of the balk element 62, a command logic may be provided that maintains the latch 50 in its open position until the respective thrust reverser door 26 is identified as being in its (e.g., fully) closed position and the lock actuator 52 is energized.

Figure 10:
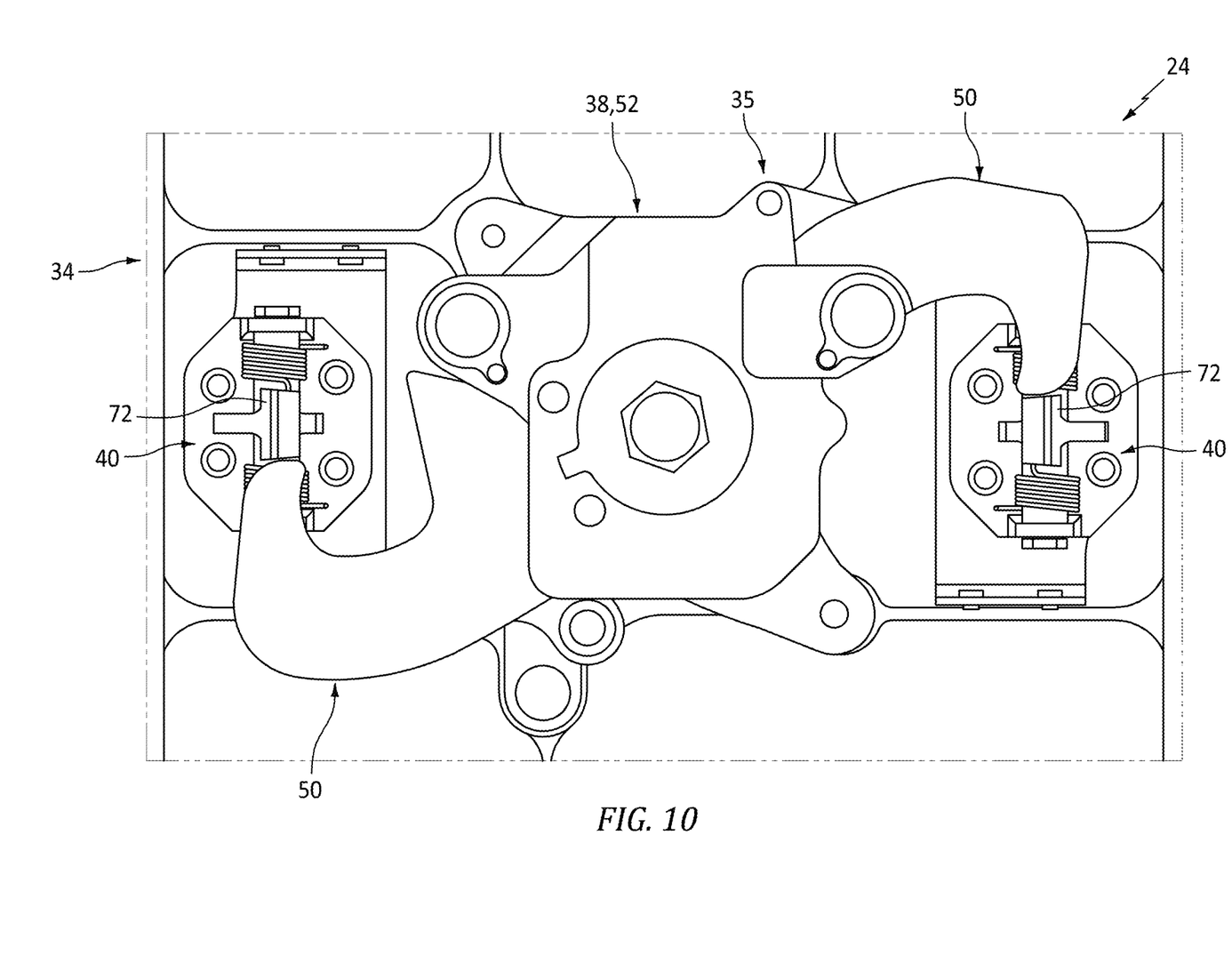
FIGS. 10-12 are partial illustrations of the thrust reverser with multiple latches actuated by a common lock actuator.
Figure 11:
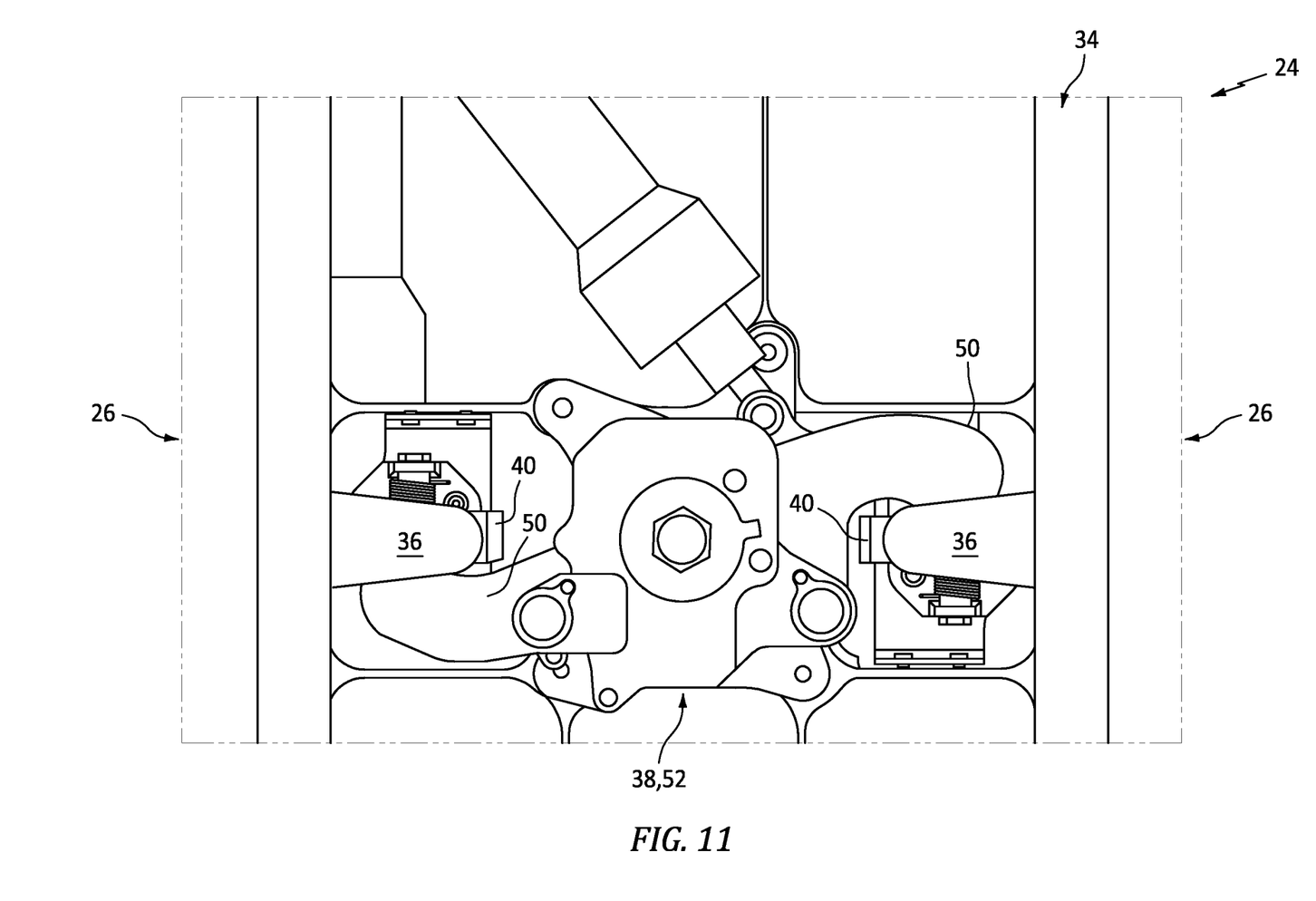
Figure 12:
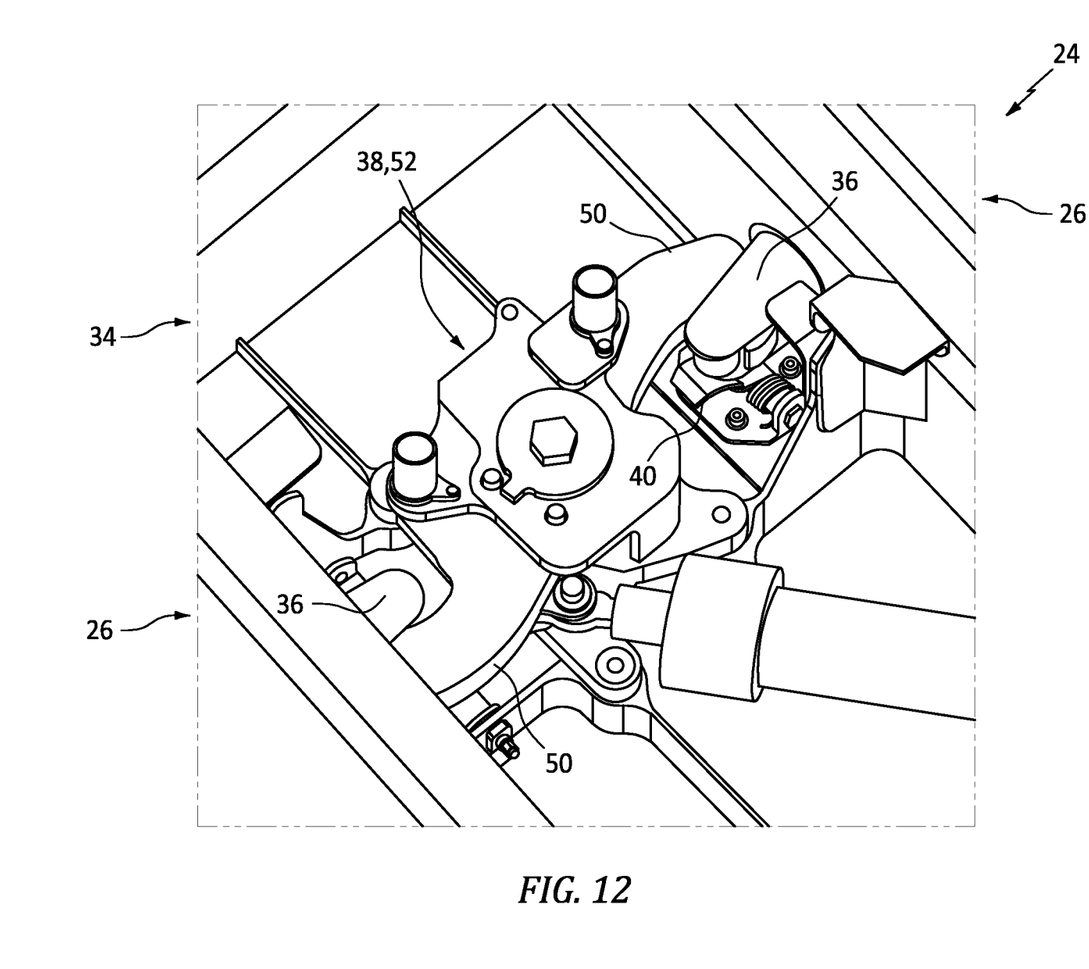

In some embodiments, each lock assembly 35 may include a single latch 50 paired with and moved by a single, dedicated lock actuator 52. However, referring to FIGS. 10-12, the lock actuator 52 may alternatively be paired with and operable to move multiple of the latches 50, where each of the latches 50 may be associated with its own fitting 36 and its own balk device 40. With such an arrangement, a single lock assembly 35 may be used to lock and secure multiple (e.g., both) thrust reverser doors 26 to the fixed structure. The lock assembly 35 may also time the locking and unlocking of its latches 50; e.g., concurrently lock and/or unlock the latches 50.

Each lock assembly 35 is described above with respect to securing at least one respective thrust reverser door 26 in its closed position. However, it is also contemplated one or more of the lock assemblies 35 may alternatively be used for securing another door on the aircraft propulsion system 22 or elsewhere on the aircraft; e.g., a fuselage door, a cowl door, a hatch, etc. Furthermore, while the latch 50 and the balk element 62 are described above as being mounted with the stationary structure 34 and the fitting 36 is described as being mounted with the respective thrust reverser door 26 (or another door), this arrangement may be reversed in other embodiments.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for an aircraft, comprising:
a latch movable between an unlocked position and a locked position;
a balk element rotatable between a balked position and an un-balked position, the balk element configured to block the latch from moving to the locked position when the balk element is in the balked position; and
a fitting comprising a keeper, the fitting movable between an open position and a closed position, the fitting configured to push the balk element into the un-balked position as the fitting moves into the closed position, and the latch configured to move to the locked position and engage the keeper when the fitting is in the closed position;
wherein the latch is rotatable about a latch axis between the unlocked position and the locked position, the balk element is rotatable about a balk element axis between the balked position and the un-balked position, and the balk element axis is angularly offset from the latch axis.

2. The assembly of claim 1, wherein the balk element axis is perpendicular to the latch axis.

3. The assembly of claim 1, further comprising:
a first mount; and
a second mount;
the balk element disposed between and rotatably connected to the first mount and the second mount.

4. The assembly of claim 1, wherein
the balk element comprises a lever arm;
the lever arm is configured to block movement of the latch to the locked position when the balk element is in the balked position; and
the fitting is configured to engage the lever arm when the fitting is in the closed position.

5. The assembly of claim 4, wherein the lever arm includes an arm base and an arm lip at a distal end of and projecting out from the arm base.

6. The assembly of claim 1, further comprising a spring element configured to bias the balk element from the un-balked position to the balked position.

7. The assembly of claim 6, wherein the spring element comprises a torsional spring.

8. The assembly of claim 6, further comprising a second spring element further configured to bias the balk element from the un-balked position to the balked position.

9. The assembly of claim 1, further comprising a stop element configured to stop rotation of the balk element at the balked position when the balk element is rotating in a direction from the un-balked position to the balked position.

10. The assembly of claim 1, further comprising a stop element configured to stop more than a predetermined amount of rotation of the balk element past the un-balked position when the balk element is rotating in a direction from the balked position to the un-balked position.

11. The assembly of claim 1, wherein
the fitting further comprises a first wall and a second wall;
the keeper is located between and connected to the first wall and the second wall; and
the first wall is configured to push the balk element into the un-balked position as the fitting moves into the closed position.

12. The assembly of claim 1, further comprising:
a stationary structure, the latch and the balk element mounted with the stationary structure; and
a door, the fitting mounted with the door;
the door secured to the stationary structure when the latch is in the locked position and is engaged with the keeper.

13. The assembly of claim 12, wherein the door is configured as a thrust reverser door.

14. The assembly of claim 1, further comprising:
a lock including the latch and a second latch, the second latch moveable between a second latch unlocked position and a second latch locked position, and movement of the second latch is timed with movement of the latch;
a second balk element rotatable between a second balk balked position and a second balk un-balked position, the second balk element configured to block the second latch from moving to the second latch locked position when the second balk element is in the second balk balked position; and
a second fitting comprising a second keeper, the second fitting movable between a second fitting open position and a second fitting closed position, the second fitting configured to push the second balk element into the second balk un-balked position as the second fitting moves into the second fitting closed position, and the second latch configured to move to the second latch locked position and engage the second keeper when the second fitting is in the second fitting closed position.

15. An assembly for an aircraft, comprising:
a door moveable between an open position and a closed position;
a latch rotatable between an unlocked position and a locked position; and
a balk element rotatable between a balked position and an un-balked position, the balk element configured to block the latch from moving to the locked position when the balk element is in the balked position, and the balk element configured to permit movement of the latch to the locked position when the balk element is in the un-balked position, wherein rotation of the balk element is passively actuated as the door moves into the closed position;
wherein the latch is rotatable about a latch axis between the unlocked position and the locked position, the balk element is rotatable about a balk element axis between the balked position and the un-balked position, and the balk element axis is angularly offset from the latch axis.

16. The assembly of claim 15, wherein the balk element is configured discrete from and is not coupled to the latch.

17. The assembly of claim 15, further comprising:
a fitting comprising a keeper;
the fitting configured to push the balk element into the un-balked position as the door moves into the closed position; and
the latch configured to engage the keeper when the door is in the closed position.

18. An assembly for an aircraft, comprising:
a stationary structure;
a door movable between an open position and a closed position;
a keeper mounted with the door;
a latch mounted with the stationary structure, the latch movable between an unlocked position and a locked position in which the latch engages the keeper and secures the door to the stationary structure; and
a balk element decoupled from the latch and rotatable between a balked position and an un-balked position, the balk element configured to block movement of the latch to the locked position when the door is not in the closed position, and the balk element configured to permit movement of the latch to the locked position when the door is in the closed position;
wherein the latch is rotatable about a latch axis between the unlocked position and the locked position, the balk element is rotatable about a balk element axis between the balked position and the un-balked position, and the balk element axis is angularly offset from the latch axis.

19. The assembly of claim 18, further comprising:
a fitting comprising the keeper;
the fitting configured to push the balk element into the un-balked position as the door moves into the closed position.

* * * * *